Aug. 24, 1965     R. W. KRITZER     3,202,212
HEAT TRANSFER ELEMENT
Filed July 29, 1963
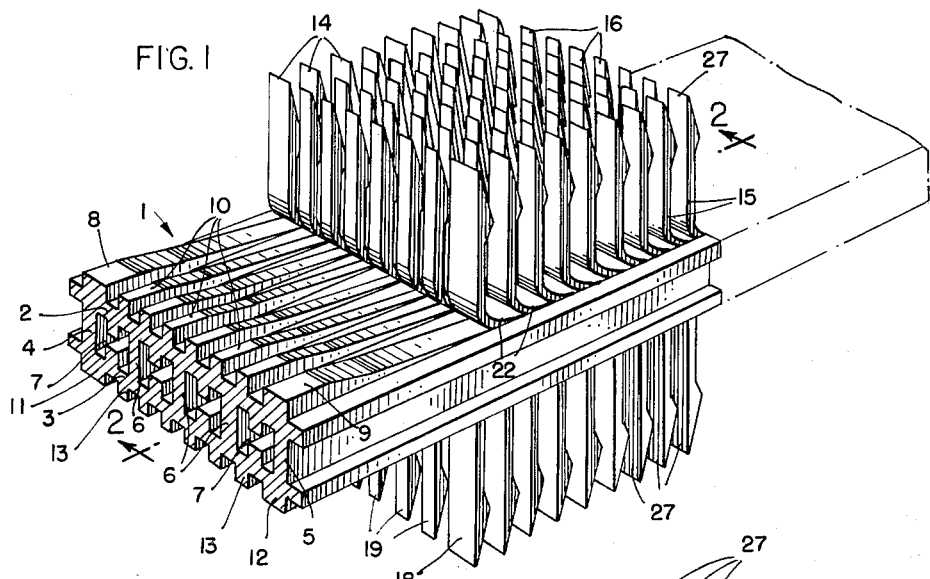
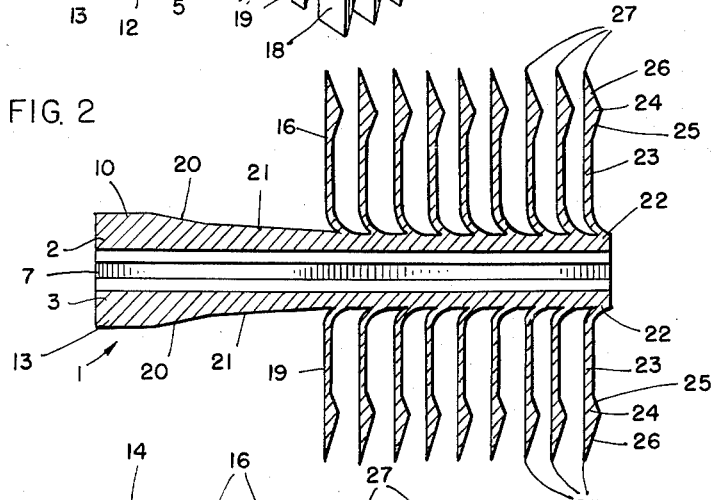
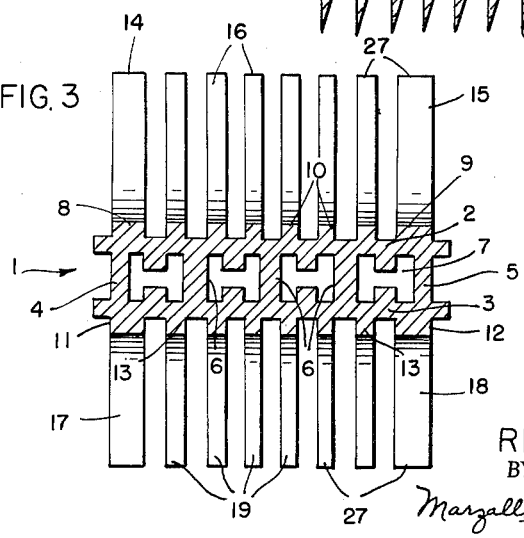
INVENTOR:
RICHARD W. KRITZER
BY
Marzall, Johnston, Cook & Root
ATT'YS

United States Patent Office 3,202,212
Patented Aug. 24, 1965

3,202,212
HEAT TRANSFER ELEMENT
Richard W. Kritzer, Chicago, Ill., assignor to Peerless of America, Incorporated, Chicago, Ill., a corporation of Illinois
Filed July 29, 1963, Ser. No. 298,129
5 Claims. (Cl. 165—179)

This invention relates in general to improvements in heat exchange elements useful in the field of refrigerating or heating. More particularly, the invention is directed to a heat transfer element formed of extruded metal, such as aluminum, wherein a great number of spines are struck from the surface of the element, such spines being relatively thin and comparatively small in cross section, thereby to provide a high ratio of exposed surface to the mass in the spines for maximum thermal transfer efficiency from the wall of the element. The present invention is designed as an improvement over the construction disclosed in my Patent No. 2,247,243.

It is recognized that heat will transfer at points and edges and where a conduit for a refrigerant fluid has projecting from the surface or wall thereof a plurality of thin heat transfer elements provided with such points and edges, the efficiency of heat transfer from such conduit will be greatly increased.

In my above referred to patent there is disclosed a tubular conduit formed of copper which has struck or gouged therefrom a plurality of spines which function to enhance the thermal transfer efficiency from the wall of the conduit. It has now been found, however, that a fluid conduit formed of an extruded metal, such as aluminum, may provide a much more economical and efficient heat exchange element than was heretofore possible with other heat transfer elements, such as tubular copper.

It is, therefore, one of the principal objects of the present invention to provide a heat transfer element formed of extruded aluminum and which has extending outwardly from the wall thereof a plurality of spines integral with the wall of such form as to provide a relatively high ratio of exposed surface to the mass of the spine.

Another object of the invention is to provide a tubular heat transfer element which has a plurality of ribs extending longitudinally of the wall thereof and from which ribs a series of spines has been gouged, thereby providing for maximum thermal transfer efficiency from the wall.

Still another object of the invention is to provide a heat transfer element which is tubular and multi-sided wherein the sides have ribs formed on the outer surface thereof from which spines extend of such form as to insure maximum heat transfer from the element.

Still another and more specific object of the invention is to provide a substantially rectangular tubular heat transfer element wherein one or more of the side walls of the element has ribs extending lengthwise thereof from which ribs relatively thin spines are gouged, thereby increasing to a maximum the heat transfer efficiency.

Other objects and advantages of the invention will become apparent upon reading the following description taken in conjunction with the accompanying drawing, in which FIG. 1 is a view in perspective of a length of heat exchange element embodying the present invention;

FIG. 2 is a longitudinal sectional view taken substantially along the plane of line 2—2 of FIG. 1, and FIG. 3 is an end elevational view of the structure shown in FIG. 1 with the body of the fluid conduit in section.

Briefly described, the invention contemplates an extruded conduit capable of carrying therethrough a refrigerant fluid. The conduit preferably has a substantially rectangular cross section, although this specific configuration is of relatively minor importance. The conduit then may be said to consist of a plurality of walls and when the configuration is rectangular, then there will be two pairs of opposed walls. One or more of these walls is provided with a plurality of ribs extending longitudinally thereof. These ribs of themselves would provide a very inefficient heat transfer because of the few points and edges which are capable of functioning to transfer heat. The ribs, therefore, have cut or gouged therefrom spines which are themselves rectangular in cross section and which are integral with the conduit wall at their bases, and terminate at their outer ends in thin edges. The spines are spaced apart longitudinally of the ribs and are likewise spaced apart laterally of the conduit so that each one of the numerous spines thus formed will be capable of efficient heat transfer.

Referring now more particularly to the drawing, the heat transfer element may be said to consist of a main body portion generally indicated by the numeral 1. The body portion is shown for purposes of illustration as having a substantially rectangular cross section. One of the walls of the conduit is indicated at 2 and its opposed wall is identified by the numeral 3. The opposed end walls 4 and 5 complete the rectangular configuration.

There is provided a plurality of inner walls 6 which extend between the opposed walls 2 and 3 thereby to provide increased strength to the element and allowing it to withstand the extreme pressures involved.

Between each of the inner walls 6, as well as between these walls and the outer walls 4 and 5, there will be passageways 7 through the body of the conduit through which the refrigerant fluid is adapted to flow.

The outer wall 2 of the element at opposed sides thereof is provided with the ribs 8 and 9. Between these outer ribs 8 and 9 a plurality of intermediate spaced-apart ribs 10 also project from the wall 2 and are integral therewith.

For maximum efficiency in heat transfer, the opposite wall 3 is likewise provided at opposite sides thereof with the outer ribs 11 and 12 and the intermediate ribs 13 therebetween.

Each of the ribs mentioned above has extending outwardly therefrom and integral therewith a plurality of spines. The appearance and relationship of these spines are clearly evident from viewing FIGS. 1 and 2. The spines extending outwardly from the side rib 8 are identified by the numeral 14 and the spines extending outwardly from the opposite rib 9 are identified by the numeral 15. The intermediate ribs 10 have similar spines extending outwardly therefrom and these spines are identified by the numeral 16.

The spines extending outwardly from the outer rib 11 are indicated at 17, while the spines extending outwardly from the rib 12 are indicated at 18. The intermediate spines extending from the intermediate ribs 13 are identified by the numeral 19.

All of the spines have a similar configuration. They are gouged from the ribs in such a way that their bases remain integral with the ribs over an area sufficient to effect an efficient heat transfer from the rib through the edges of the spines. The spines are formed by means of a suitable cutting tool which first cuts along lengthwise of the rib to form the surface 20 and then continues to form the surface 21. The spine thus cut or gouged from the rib is then bent outwardly preferably to approximately 90° with respect to the plane of the rib. This gives each spine a configuration illustrated in the drawing wherein it may be said that each spine has a base portion 22, an intermediate thin portion of rectangular cross section 23, a larger rectangular section 24 having the sloping surfaces 25 and 26 and terminating at the outer end thereof in the edge 27.

Each spine is thus formed in such a way as to provide a relatively high ratio of exposed surface to the mass of the spine, thereby to insure maximum efficiency in heat transfer. The outermost spines 14, 15, 17, and 18, and the ribs from which they are cut, are wider than the intermediate spines 16 and 19, and the ribs from which they are cut. This construction acts to protect the smaller intermediate spines and ribs. It will be noted also that the spines are not only spaced apart longitudinally of each of the ribs from which they are cut, but also are spaced apart laterally of the element so that there will be ample opportunity for heat transfer from each spine.

It will thus be evident from the foregoing that the heat transfer element of the invention, being formed of extruded metal and preferably aluminum, is much more economical to manufacture than heat transfer elements of the past, including copper tubing. Furthermore, the spines being cut from elongated ribs on the wall of the element may be formed more economically than those disclosed, for example, in my earlier above referred to patent. Also, the number and shape of the spines relative to the size of the transfer element itself can be increased and thereby provide for greater heat transfer efficiency. The extruded conduit can be bent and formed into desired configurations more easily than a tubular conduit without interfering with the heat transfer efficiency of the spines thereon.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A heat transfer element comprising,
   (a) a tubular member having an elongated wall,
   (b) a plurality of outwardly projecting ribs extending longitudinally of said wall in laterally spaced-apart relation, and
   (c) a series of spines projecting outwardly from said ribs, said spines
   (1) having base portions integral with said ribs,
   (2) being closely spaced apart along the length of said ribs, and
   (3) having an elongated, substantially rectangular cross-section disposed transversely to the length of said ribs and which cross-section terminates at the outer ends of said spines in a thin edge portion,
   (4) thereby providing a relatively high ratio of exposed surface to the mass, for high efficiency in heat transfer.

2. A heat transfer element as defined in claim 1, and in which said tubular member is substantially rectangular in transverse cross-section.

3. A heat transfer element as defined in claim 2, and which includes a plurality of inner walls within said tubular member dividing said member into a plurality of passageways.

4. A heat transfer element as defined in claim 1, and in which said spines terminate at the outer end portions thereof in enlarged portions which taper outwardly to an enlarged portion and then inwardly to a thin edge in a direction toward said free ends.

5. A heat transfer element as defined in claim 1, and in which said spines are gouged from said ribs.

References Cited by the Examiner

UNITED STATES PATENTS

| | | | |
|---|---|---|---|
| 898,107 | 9/08 | Hill | 165—185 |
| 1,306,175 | 6/19 | Dady | 165—181 X |
| 2,247,243 | 6/41 | Kritzer | 165—177 |
| 3,022,982 | 2/62 | Damalander | 165—179 X |

FOREIGN PATENTS 416,016  11/46  Italy.

CHARLES SUKALO, *Primary Examiner.*

FREDERICK L. MATTESON, Jr., *Examiner.*

UNITED STATES PATENT OFFICE
CERTIFICATE OF CORRECTION

Patent No. 3,202,212                      October 24, 1965

Richard W. Kritzer

It is hereby certified that error appears in the above numbered patent requiring correction and that the said Letters Patent should read as corrected below.

Column 4, line 36, for "416,016" read -- 416,015 --.

Signed and sealed this 24th day of May 1966.

(SEAL)
Attest:

ERNEST W. SWIDER
Attesting Officer

EDWARD J. BRENNER
Commissioner of Patents